United States Patent [19]

Kisaka

[11] Patent Number: 5,404,254
[45] Date of Patent: Apr. 4, 1995

[54] METHOD AND APPARATUS FOR CONTROLLING HEAD POSITION

[75] Inventor: Masashi Kisaka, Yokohama, Japan

[73] Assignee: International Business Machines Corporation, Armonk, N.Y.

[21] Appl. No.: 127,704

[22] Filed: Sep. 27, 1993

Related U.S. Application Data

[63] Continuation of Ser. No. 33,448, Mar. 18, 1993, abandoned, which is a continuation of Ser. No. 696,392, May 6, 1991, abandoned.

[30] Foreign Application Priority Data

May 8, 1990 [JP] Japan ................................ 2-117029

[51] Int. Cl.$^6$ .............................................. G11B 7/09
[52] U.S. Cl. ..................................... 360/78.6; 360/75; 360/77.1; 360/78.7; 360/78.4
[58] Field of Search ...................... 369/44.11, 44.28, 58, 369/32, 44.29, 44.32, 43, 44.25; 360/75, 77.01, 77.05, 77.08, 78.01, 77.11, 78.07, 78.06, 78.04, 78.08, 77.02

[56] References Cited

U.S. PATENT DOCUMENTS

| | | |
|---|---|---|
| 4,627,038 | 12/1986 | Abed et al. ................... 369/44.29 |
| 4,697,127 | 9/1987 | Stich et al. . |
| 4,937,803 | 6/1990 | Nakane ........................ 360/78.06 |
| 5,048,001 | 9/1991 | Moriya et al. ................ 369/44.28 |

Primary Examiner—Aristotelis Psitos
Assistant Examiner—Muhammad N. Edun
Attorney, Agent, or Firm—Richard E. Billion; Steven W. Roth

[57] ABSTRACT

Disclosed is a rotating memory device or disk drive which includes a rotating media having tracks thereon and an actuator arm which includes a head for writing representations of data to the track on the rotating memory. The head also reads representations of data from the track of the rotating memory. The head is attached to the actuator arm. The actuator arm is used to move the head to a selected position over the rotating memory such as over the track in the rotating memory. Also disclosed is an apparatus that corrects for errors of low frequency. The device includes circuitry for producing a position error signal for integrating the position error signal to produce a control signal that is used to correct for any errors in the position of the head. The device also includes circuitry for detecting cross track head speed per sector which produces a signal used to control the integration of the position error signal.

16 Claims, 4 Drawing Sheets

METHOD AND APPARATUS FOR CONTROLLING HEAD POSITION

This application is a continuation of U.S. application Ser. No. 08/033,448, filed Mar. 18, 1993, now abandoned, which is a continuation of U.S. application Ser. No. 07/696,392, filed May 6, 1991, now abandoned.

FIELD OF THE INVENTION

This invention relates to a disk apparatus wherein data is written to or read from a target track on a disk through a head, and is particularly concerned with a method and apparatus for controlling a position of the head through the use of an integrator to cancel a steady error during a track following operation by a head.

BACKGROUND OF THE INVENTION

In the above disk apparatus, a voice coil motor (thereafter abbreviated as VCM) of an actuator used to drive a head receives nearly constant or very low frequency bias forces during the track following operation by the head. These bias forces are caused by a circulating air stream which passes through an arm assembly whereby the head is connected to VCM, and the motion of a flexible cable for conveying input or output signals from the head to electronic circuits. Also, there is an offset voltage with respect to a power amplifier which provides a control current to VCM. The above bias and offset voltage cause a steady error in the disk apparatus.

Japanese Published Unexamined Patent Application (PUPA) No. 62-257682, and the corresponding U.S. Pat. No. 4,679,103 disclose that a stiffness integrator wherein a head position error signal is integrated, is inserted in a feedback loop when a head is positioned within the range close to half of a track width from the center line of a target track.

PUPA No. 63-23280 and the corresponding U.S. Pat. No. 4,697,127 disclose that if the current sector and the previous sector are denoted by k+1 and k, respectively and a head position for sector k(equivalent to a position error (PES)) is X1(k), an integrator which outputs an integrated position X4(k+1) with respect to sector (k+1), shown by the following equation:

$$X4(k+1) = X4(k) + X1(k)$$

(That is, X4 is a total of sequentially added X1.)
is provided and the integrated position signal which is an output from the integrator is combined with a head position (error) signal and an estimated speed signal in track following mode to generate a signal that indicates the magnitude of a current to be inputted to the VCM of the actuator whereby the head is driven.

As disclosed in PUPA No. 62-257682, PUPA No. 63-23280, an integrator is provided in the feedback loop in the track following mode in order to cancel the above steady error. However, insertion of the integrator in the loop causes an overshoot. Thus, if head position control is performed using a integrating signal for a position error signal when the speed of the head is too high, an excessive overshoot will occur and thereby a settling time for the head will increase.

An object of this invention is to provide method and apparatus for controlling a position of a head in order to prevent an excessive overshoot from occurring when the speed of the head is too high during a follow track operation.

SUMMARY OF THE INVENTION

According to a head position control method of this invention, in the case where an output signal of an integrator which performs integration of a head position error signal indicating any positional difference of a head from a target track on a disk is used as a steady error compensation signal for a disk apparatus to cause the head to follow the target track, the head position error signal is inputted to the integrator when the speed of the head is within a predetermined range (for example, ranges from $-\frac{1}{4}$ track width/sector time to $+\frac{1}{4}$ track width/sector time) and the input of a head position error signal to the integrator is prohibited at a time when the speed of the head is not within a predetermined range When the head position error signal is generated for each sampling time, the above integration is a digital integration wherein multiple head position error signals generated for each sampling time from the past to the present time are added to generate a steady error compensation signal. In this case, a steady error compensation signal is generated with no addition of a head position error signal at a when the head speed is not within the predetermined range.

More particularly, in accordance with the head position control method of this invention, a head is caused to follow a target track in accordance with the following expression wherein head position error signals Y(n) and Y(n−1) indicate the positional difference of said head from said target track at sampling times tn and tn−1 (n: positive integer) respectively, integral symbols I(n) and I(n+1) define integration for the head position error signals at sampling times tn and tn+1 respectively, and U(n), U(n−1), and U(n−2) represent head position control signals at sampling times tn, tn−1, and tn−2 respectively, supplied to an actuator which moves said head:

$$U(n) = k1^*Y(n) + k2^*Y(n-1) + k3^*U(n-1) + k4^*U(n-2) + k5^*I(n)$$

where $I(n+1) = I(n) + Y(n)$ (if the speed of said head is within the predetermined range)

$I(n+1) = I(n)$ (if the speed of said head is not within the predetermined range)

(k1, k2, k3, k4, and k5 are feedback coefficients.)

The head position control apparatus of this invention, which controls a head drive actuator so that a head can follow a target track on a disk, comprising:

head position error detecting means for generating a head position error signal indicating the positional difference of said head from said target track at each sampling time;

adding means for adding a signal applied to a first input to a signal applied to a second input to produce an output;

head speed detecting means for outputting an excessive head speed signal when the speed of said head is greater than the predetermined value;

switching means provided between said head position detecting means and the first input of said adding means, for supplying said head position error signal to said first input when said excessive head speed signal is not outputted and cutting the supply of said head position error signal to said first input when said excessive head speed signal is outputted;

delaying means for delaying an output from said adding means by one sampling interval;

feedback means for providing an output of said delaying means to the second input of said adding means; and position control signal generating means for generating a position control signal to be provided to said actuator, based on at least said head position error signal and an output of said delaying means.

According to this invention, a steady error compensation signal is generated without the process of integration (addition) of a head position error signal at a time when the head speed is greater than a predetermined value, thus the steady error compensation signal will not come to be more than allowed and accordingly an excessive overshoot will be prevented from occurring.

DESCRIPTION OF THE PREFERRED EMBODIMENT

Figure 1:
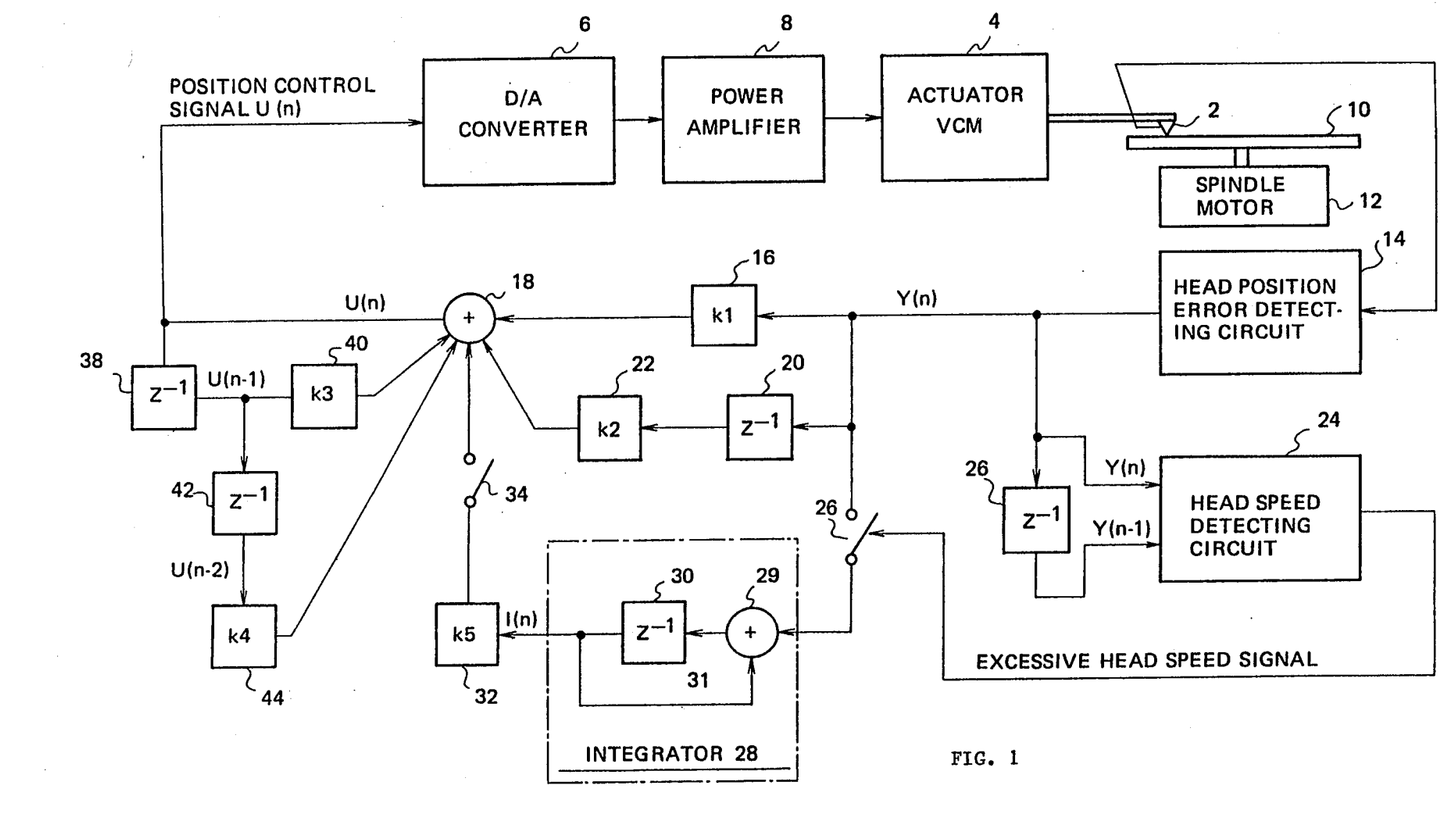
FIG. 1 is a block diagram showing an embodiment of this invention applied to a magnetic disk apparatus.

FIG. 1 shows an embodiment of a head position control apparatus in a magnetic hard disk apparatus whereto the present invention is applied. VCM of an actuator supporting a magnetic head 2 makes the magnetic head 2 follow a target track on a magnetic hard disk 10 in accordance with a position control signal U(n) inputted through a digital-to-analog (D/A) converter 6 and then a power amplifier 8. The magnetic disk 10 is rotated by a spindle motor 12.

Figure 2:
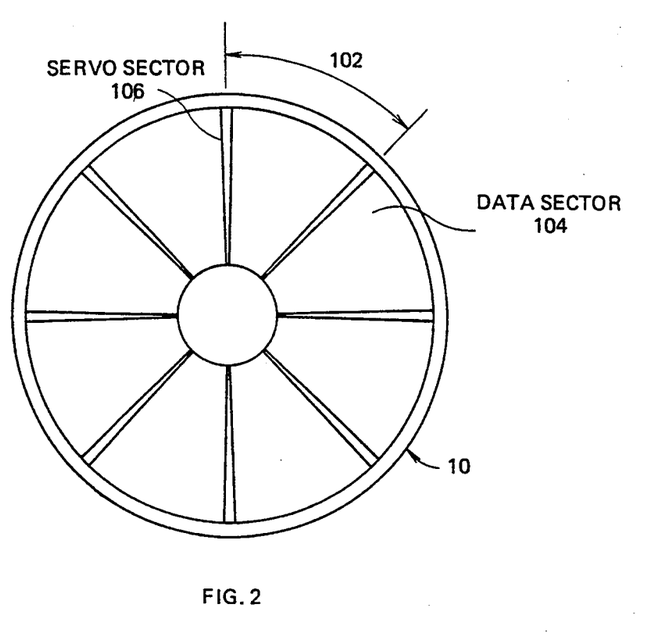
FIG. 2 shows an example of the construction of a magnetic disk of FIG. 1.

The magnetic disk 10, as shown in FIG. 2, is divided into multiple sectors 102 arranged at equal distances. Although only 8 sectors are shown in FIG. 2, in practice, for example 32 sectors are arranged. Each sector 102 is composed of a servo sector 106 wherein servo information is recorded and a data sector 104 to/from which data is written/read through the magnetic head 2.

Figure 3:
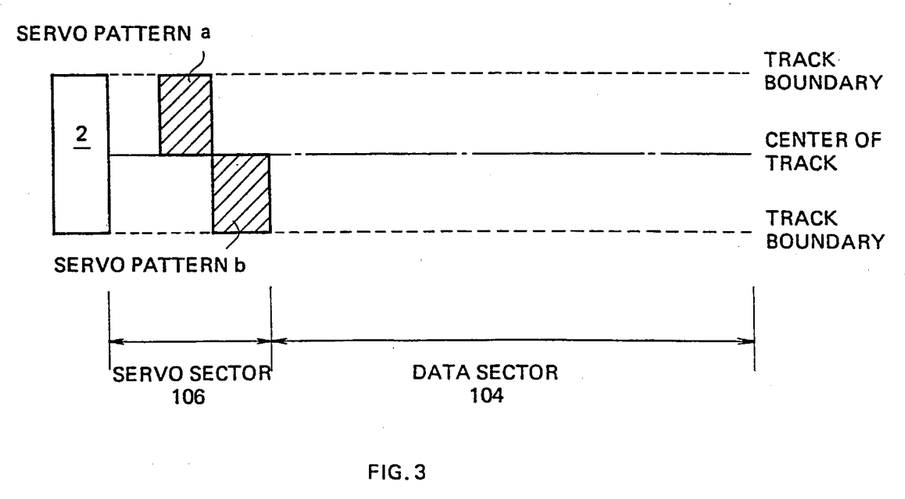
FIG. 3 shows an example of servo patterns for the magnetic disk illustrated in FIG. 2.

FIG. 3 shows a servo information pattern recorded in the servo sector 106 on the magnetic disk 10. The servo information pattern includes servo patterns a and b each recorded on both sides across the center of a track.

Figure 4:
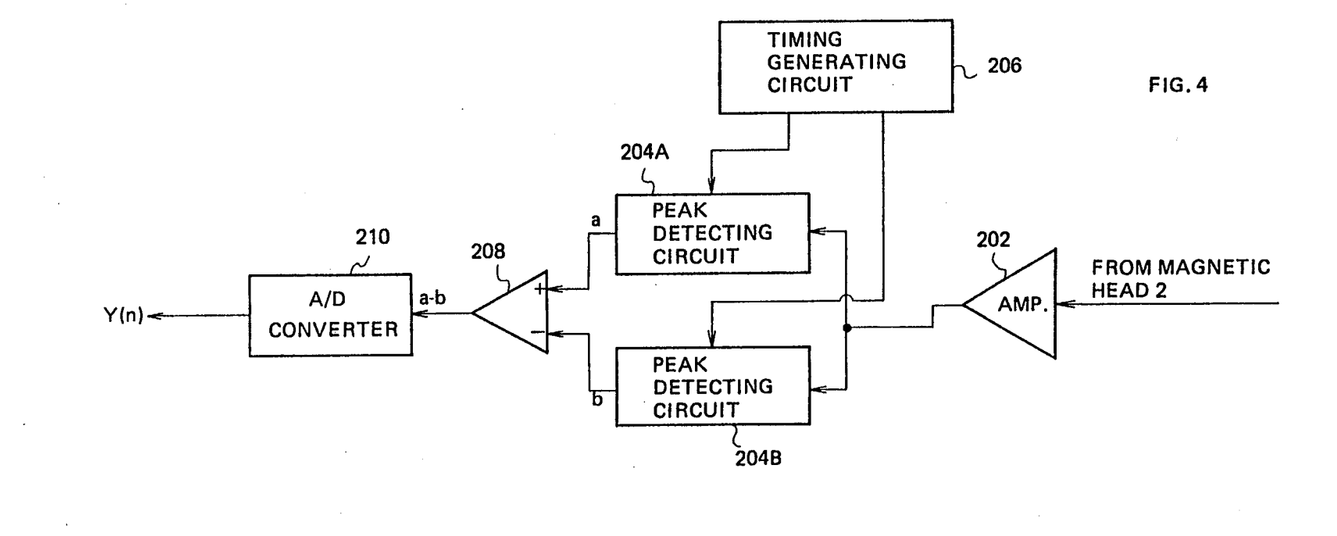
FIG. 4 is a block diagram showing a construction example of the head position error detecting circuit illustrated in FIG. 1.

A head error detecting circuit 14 shown in FIG. 1 outputs a head position error signal Y(n) indicating the positional difference of the magnetic head 2 from a target track on the magnetic disk 10 each time the magnetic head 2 reads the servo patterns a and b of each sector 102, that is, for each sampling time tn of the servo information. FIG. 4 shows one example of a structure of the head position error detecting circuit 14. An amplifier 202 is used to amplify a read signal from the magnetic head 2. Peak detecting circuits 204A and 204B output peak values a and b of a read signal generated when the head 2 reads a servo pattern a and b, respectively, in accordance with a timing signal outputted from a timing generating circuit 206. A differential amplifier 208 outputs a difference signal (a−b) indicating the difference between the peak values a and b and then the analog-to-digital (A/D) converter 210 changes the difference signal (a−b) to a digital signal. As shown in FIG. 3, the difference signal (a−b) is at 0 level thus a head position error signal Y(n) is at 0 level if the center of the head 2 accords with that of a target track. If the center of the head 2 accords with track boundary A, the difference signal outputted from the differential amplifier 208 conveys only a peak value produced when the head reads a servo pattern a. Thereupon, the A/D converter outputs a digital signal Y(n) corresponding to the peak value a to indicate that the head is at the distance of $+\frac{1}{2}$ track width from a target track. If the center of the head 2 accords with track boundary B, the difference signal outputted from the differential amplifier 208 conveys a peak value b, with polarity changed to negative, produced when the head 2 reads a servo pattern b, Thereupon, the A/D converter 210 outputs a digital signal Y(n) corresponding to the peak value b the polarity of which is negative to indicate that the head is at the distance of $-\frac{1}{2}$ track width from a target track.

An output Y(n) from the head position error detecting circuit 14 is multiplied by a coefficient k1 in a coefficient multiplier 16 and then is provided to a first input of an adder 18. Also, a head position error signal is delayed by one sampling interval (that is, one sector time=time required if the disk rotates by one sector) in a delaying element 20 and is multiplied by a coefficient k2 in an coefficient multiplier 22 and then is provided to a second input of the adder 18. Accordingly, both k1*Y(n) and k2*Y(n−1) are applied to the adder 18 at the same time. Also, the head position error signal Y(n) is provided to a first input of the head, speed detecting circuit 24. Also, the head position error signal is delayed by one sampling interval (that is, one sector time) in a delaying element 25 and is provided to a second input of the head speed detecting circuit 24. This means that a head position error signal Y(n−1) outputted one sampling interval (one sector time) earlier than a head position error signal Y(n) is provided to the second input of the circuit 24 when the signal Y(n) is provided to the first input of the circuit 24.

Figure 5:
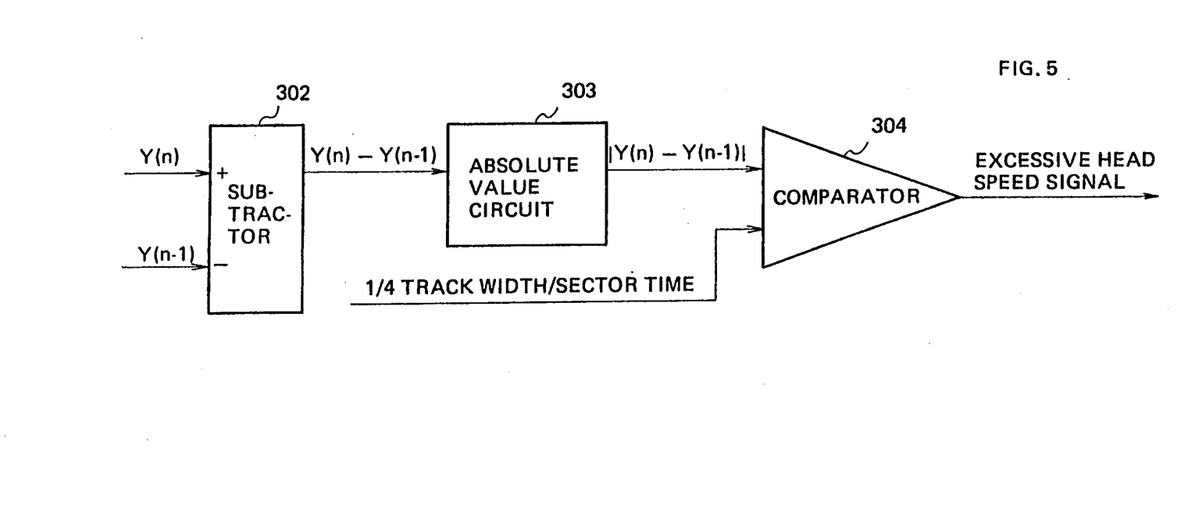
FIG. 5 is a block diagram showing a construction example of the head speed detecting circuit illustrated in FIG. 1.

FIG. 5 shows one example of a structure of the head speed detecting circuit 24. A subtracter 302 outputs a difference signal. {Y(n)−Y(n−1)} conveying the difference between head position error signals Y(n) and Y(n−1). An absolute value circuit 303 outputs an absolute value |Y(n)−Y(n−1)| of the difference signal and then a comparator 304 compares this absolute value with a signal indicating a predetermined speed, that is, $\frac{1}{4}$ track width/sector time. The comparator 304 outputs an excessive head speed signal when the absolute value |Y(n)−Y(n−1)| of a head speed is greater than a predetermined value ($\frac{1}{4}$ track width/sector time).

A switch 26 disposed between the head position error detecting circuit 14 and a digital integrator 28 is on state in which the head position error signal Y(n) is provided to the digital integrator 28 if the excessive head speed signal is not received from the circuit 24 and is off state in which a path of a head position error signal Y(n) to the digital integrator 28 is broken if the excessive head speed signal is received from the circuit The integrator 28 is provided to generate a steady error compensation signal required to cancel a steady error for the magnetic disk apparatus that results from bias forces applied to VCM and an offset voltage with respect to the power amplifier 8 that provides a control current to VCM, and comprises an adder 29 to a first input of which a signal is provided from the switch 26, a delaying element 30 wherein an output from the adder 29 is delayed by one sampling interval, that is, one sector time, and a feedback loop 31 through which an output from the delaying element 30 is provided to a second input of the adder 29. An output signal I(n+1) of the integrator 28 is expressed as follows:

$$I(n+1) = I(n) + Y(n) \tag{2}$$

if the absolute value of the speed of the head is greater than the predetermined value ($\frac{1}{4}$ track width/sector time), or $$I(n+1) = I(n) \tag{3}$$

if the absolute value of the speed of the head 2 is less than or equal to a predetermined value ($\frac{1}{4}$ track width/sector time).

The output of the integrator 28 is multiplied by a coefficient k5 in a coefficient multiplier 32 and then is provided to a third input of the adder 18 through a switch 34. The switch 34 is set to on state when the head 2 is positioned within the range of a distance, $\pm\frac{1}{2}$ track width from the center line of a target track. This is well known as described in, for example, PUPA 62-257682. Therefore, for a circuit that generates a signal for setting the switch 34 on/off, further description is omitted.

An output signal, that is, a position control signal U(n) from the adder 18 is delayed by one sampling interval, that is, one sector time in a delaying element 38, is multiplied by a coefficient k3 in a coefficient multiplier 40 and then is provided to a fourth input of the adder 18. Therefore, a signal provided to the fourth input of the adder 18 can be represented by k3*U(n−1). Also, the output signal U(n−1) from the delaying element 38 is delayed by one sampling interval, that is, one sector time in a delaying element 42, is multiplied by a coefficient k4 in a coefficient multiplier 44, and then is provided to a fifth input of the adder 18.

Now, if head position error signals that indicate the positional difference of said head from said target track at sampling times tn and tn−1 (n: positive integer) are represented by Y(n) and Y(n−1) respectively, integral signals I(n) and I(n+1) define integration for head position error signals at sampling times tn and tn+1 respectively, and U(n), U(n−1), and U(n−2) represent head position control signals at sampling times tn, tn−1, and tn−2 respectively, provided to the actuator which moves said head, then an output signal, that is, a head position control signal U(n) outputted from the adder 18 can be expressed by the following expression (1):

$$U(n) = k1*Y(n) + k2*Y(n-1) + k3*U(n-1) + k4*U(n-2) + k5*I(n) \tag{1}$$

where if the speed of the head 2 is within a predetermined range ($\pm\frac{1}{4}$ track width/sector time), then $$I(n+1) = I(n) + Y(n) \tag{2}$$

and if the speed of the head 2 is not within a predetermined range ($\pm\frac{1}{4}$ track width/sector time), then $$I(n+1) = I(n) \tag{3}$$

A position control signal U(n) is converted to an analog current signal by the D/A converter 6 and this current signal is amplified by the power amplifier 8 and is provided to the VCM of the actuator 4.

In the following section, it will be described that a position control signal given by the expression (1) can stably control the VCM 4.

In the analog system, VCM can be expressed by Newton's equation as follows:

$$J\frac{d2}{dt}Y = Kt*U \tag{4}$$

where U:VCM current
Kt:Torque constant
Y:Position
J:Inertia

The above equation can be written in matrices as follows:

$$\frac{d}{dt}\begin{vmatrix}Y\\V\end{vmatrix} = \begin{vmatrix}0 & 1\\0 & 0\end{vmatrix}\begin{vmatrix}Y\\V\end{vmatrix} + \begin{vmatrix}0\\Kt/J\end{vmatrix}U \tag{5}$$

If U(n) is outputted for control in d seconds after Y(n) is read at a sampling time tn, and the value of U(n) is held until tn+1, the discrete representation of the expression (4), in accordance with a method described on page 173 of "Digital Control Theory" by Tsutomu Mita (Shokodo, 1984) is as follows:

$$\begin{vmatrix}Y(n+1)\\V(n+1)\\U(n)\end{vmatrix} = \begin{vmatrix}1 & T & A1\\0 & 1 & A2\\0 & 0 & 0\end{vmatrix}\begin{vmatrix}Y(n)\\V(n)\\U(n-1)\end{vmatrix} + \begin{vmatrix}B1\\B2\\1\end{vmatrix}U(n) \quad A\begin{vmatrix}Y(n)\\V(n)\\U(n-1)\end{vmatrix} + B*U(n) \tag{6}$$

where A1:Kt/j*d/2*(2*T−d)
A2:Kt/j*d
B1:Kt/j*½*(T−d)2
B2:Kt/j*(T−d)
T:Sampling interval The expression (6) can be transformed to a pulse transfer function wherein Y is determined from U as follows:

$$Y(z) = [100][z*I - A]^{-1} B\ U(z) \tag{7}$$
$$= \frac{a1*Z^{-1} + a2*Z^{-2} + a3*Z^{-3}}{(1 - z^{-1})2} U(z)$$

This can be expressed by the following difference equation:

$$Y(n+1) = 2*Y(n) - Y(n-1) + a1*U(n) + a2*U(n-1) + a3*U(n-2) \tag{8}$$

From the above equation, the following matrix equation with state variables {Y(n), Y(n−1), U(n−1), U(n−2)} can be obtained.

$$\begin{vmatrix} Y(n+1) \\ Y(n) \\ U(n) \\ U(n-1) \end{vmatrix} = \begin{vmatrix} 2 & -1 & a2 & a3 \\ 1 & 0 & 0 & 0 \\ 0 & 0 & 0 & 0 \\ 0 & 0 & 1 & 0 \end{vmatrix} \begin{vmatrix} Y(n) \\ Y(n-1) \\ U(n-1) \\ U(n-2) \end{vmatrix} + \begin{vmatrix} a1 \\ 0 \\ 1 \\ 0 \end{vmatrix} U(n) \quad (9)$$

The first row is the expression (8). The second, third, and fourth rows will be obvious by expansion. The above matrix equation is controllable and shows that stable control can be performed if the state variables {Y(n), Y(n−1), U(n−1), U(n−2)} are fed back. If the integration terms I(n) is added to the equation (8), then:

$$\begin{vmatrix} Y(n+1) \\ Y(n) \\ U(n) \\ U(n-1) \\ I(n+1) \end{vmatrix} = \begin{vmatrix} 2 & -1 & a2 & a3 & 0 \\ 1 & 0 & 0 & 0 & 0 \\ 0 & 0 & 0 & 0 & 0 \\ 0 & 0 & 1 & 0 & 0 \\ 1 & 0 & 0 & 0 & 1 \end{vmatrix} \begin{vmatrix} Y(n) \\ Y(n-1) \\ U(n-1) \\ U(n-2) \\ I(n) \end{vmatrix} + \begin{vmatrix} a1 \\ 0 \\ 1 \\ 0 \\ 0 \end{vmatrix} U(n) \quad AA * X(n) + BB * U(n) \quad (10)$$

where

X(n)=[Y(n) Y(n−1) U(n−1) U(n−2) I(n)]t

The modern control theory made it clear that the following control input may be used so as to be able to stably control the above equation.

$$U(n)=k1*Y(n)+k2*Y(n-1)+k3*U(n-1)+k4*U(n-2)+k5*I(n)=k*X(n) \quad (11)$$

where

K=[k1 k2 k3 k4 k5]

The coefficients k1, k2, k3, k4, and k5 can be obtained based on certain calculations using the pole placement method or LQ method. Examples of calculating these coefficients are described in "Digital control of Dynamic Systems" by G. F. Franklin and J. D. Powell (Addison-Wesley, Mass., 1980).

If the expression (11) is substituted in the equation (10), the resulting expression can be as follows:

$$\begin{aligned} X(n+1) &= AA*X(n) + BB*K*X(n) = (AA + BB*K) \\ &\quad * X(n) = (AA + BB*K) * (AA + BB*K) \\ &\quad * X(n-1) \\ &\ldots = (AA + BB*K)^{n+1} * X(0) \end{aligned}$$

As is obvious from this equation, stable control is possible so far as the matrix (AA+BB*K)n do not diverge. In other words, a method for selecting K so that this matrix does not diverge is the pole placement method or the LQ method. However, this theory says nothing except that stable coefficients can be always obtained if X(n) is fed back, moreover it is beyond the stretch of the theory to say that control can not be performed by using variables fewer than X(n). In most cases, control can be performed by using the small number of variables, however smaller number of variables make it impossible to design closely.

Figure 6:
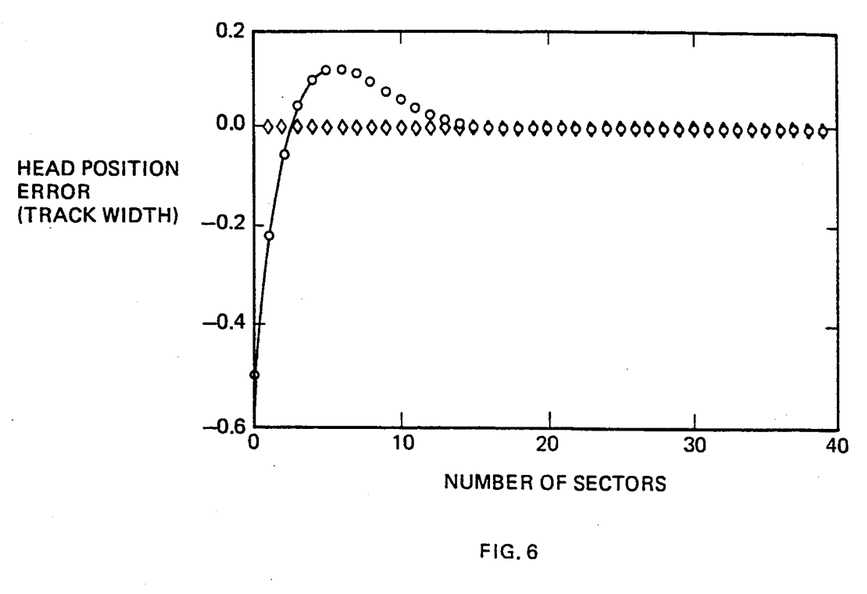
FIG. 6 is a graph showing how head position error transits if the head position is controlled in accordance with the prior art.

FIG. 6 shows an example of how the head position error transits if all head position error signals Y(n) are integrated. to generate a steady error compensation signal with no relation with the speed of the head 2, that is, in a situation where the head speed detecting circuit 24 and the switch 26 are not provided. It is clear from the figure that an excessive overshoot occurs and thereby the settling time becomes longer. The example of FIG. 6 is one under the condition that if a VCM system is represented by the following equation:

$$\begin{vmatrix} X(n+1) \\ V(n+1) \\ U(n) \end{vmatrix} = \begin{vmatrix} 1 & 1 & 0.565 \\ 0 & 1 & 0.733 \\ 0 & 0 & 0 \end{vmatrix} \begin{vmatrix} X(n) \\ V(n) \\ U(n-1) \end{vmatrix} + \begin{vmatrix} 0.237 \\ 0.873 \\ 1 \end{vmatrix} U(n)$$

where X:Position
V:Velocity
and initial conditions are as follows:
X(0)=−0.5
V(0)=0.3
U(−1)=0
control has been performed by a position control signal U(n) and an integration signal In (that is a steady error compensation signal) represented by the following expression.

$$U(n)=-1.135*Y(n)+0.815*Y(n-1)-1.06*U(n-1)-0.136*U(n-2)-0.05*I(n)$$

$$I(n+1)=I(n)+Y(n)$$

Figure 7:
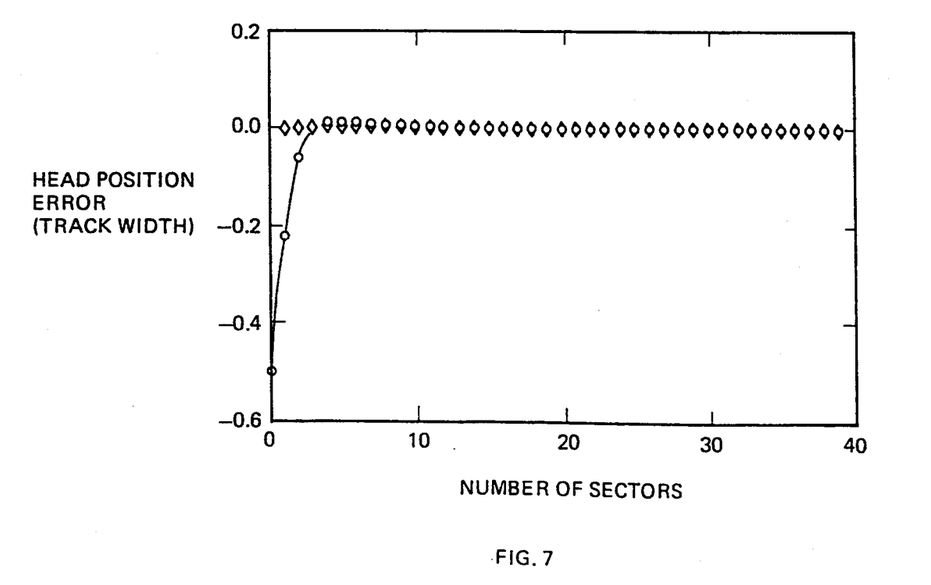
FIG. 7 is a graph showing how head position error transits if the head position is controlled in accordance with the embodiment of this invention shown in FIG. 1.

FIG. 7 shows an example of how the head position error transits when a steady error compensation signal is generated with the integration of a head position error signal for the speed of the head 2 within a predetermined range (from −¼ track width/sector time to +¼ track width/sector time) and with no integration of a head position error signal for the speed of the head 2 without a predetermined range (from −¼ track width/sector time to +¼ track width/sector time) by using the head speed detecting circuit 24 and switch 26, as shown in the preferred embodiment of this invention in FIG. 1. It is clear from FIG. 7 that an overshoot reduces and the settling time becomes shorter. A position control signal U(n) and integration signal I(n) for FIG. 7 are as follows:

$$U(n)=-1.135*Y(n)+0.815*Y(n-1)-1.06*U(n-1)-0.136*U(n-2)-0.05*I(n)$$

$$I(n+1)=I(n)+Y(n)$$

(if the head speed is within a predetermined range)

$$I(n+1)=I(n)$$

(if the head speed is not within a predetermined range)

The coefficient multipliers 16, 22, 32, 40, and 44, the adder 18, the delaying elements 20, 26, 38, and 42, the head speed detecting circuit 24, and the integrator 28, shown in FIG. 1 can be constructed by microprocessors and programs.

In the above preferred embodiment, when the absolute value of a head speed is greater than ¼ track width/sector time the integration of the head position error signal is inhibited. However, it is not always necessary to use ¼ track width/sector time as a standard and it is needless to say that an appropriate value can be selected according to the characteristic of a disk apparatus.

Advantages of the Invention

According to this invention, an overshoot does not go to excess and thus a settling time can be shortened even though a speed of the head becomes too high during a track following operation.

The present invention and the best mode of practicing it have been described. It is to understood that the foregoing description is illustrative only and that other means and techniques can be employed without departing form the full scope of the invention as described in the appended claims.

What I claim is:

1. In an apparatus for controlling a head drive actuator in order to make a head follow a target track on a disk, a track follow control mechanism comprising:
   head position error detecting means for generating a head position error signal at sampling intervals corresponding to the radial position of the head with respect to the disk, said head position error detecting means indicating the positional difference of said head from said target track;
   adding means for adding a signal applied to a first input to a signal applied to a second input to produce an output;
   head speed detecting means for outputting an excessive head speed signal when the speed of said head exceeds a predetermined value, said head speed detecting means being responsive to said head position error detecting means;
   switching means provided between said head position error detecting means and the first input of said adding means, for supplying said head position error signal to said first input when said excessive head speed signal is not outputted and prohibiting said head position error signal from being supplied to said first input when said excessive head speed signal is outputted;
   delaying means for delaying an output from said adding means by one sampling interval;
   feedback means for providing an output of said delaying means to the second input of said adding means; and
   position control signal generating means for generating a position control signal to be provided to said actuator and output from said adding means, said position control signal generating means based on at least said head position error signal and an output of said delaying means.

2. The tracking control apparatus as claimed in claim 1 wherein multiple sectors are formed on said disk and said head speed detecting means output said excessive head speed signal when said head moves by a distance greater than a predetermined track width in the forward or backward direction off of said target track while said disk rotates by one sector.

3. The tracking control apparatus as claimed in claim 2 wherein said predetermined track width is ¼ track width.

4. A storage apparatus, said storage apparatus comprising:
   a rotating media which further includes tracks;
   a head for reading and writing representations of data to and from tracks on the rotating media; and
   a track follow control mechanism, said track follow control mechanism comprising:
   an actuator for selectively positioning the head over one of the tracks of the rotating media, said one of the tracks being a target track;
   means for generating a head position error signal as the head flies over said target track;
   means for integrating the head position error signal and producing a control signal to move the actuator in response to a position error signal;
   means for detecting movement of the head within a predetermined range of speed; and
   means for preventing the integration of the head position error signal in response to the means for detecting movement of the head detecting a speed beyond the predetermined range of speed.

5. The storage apparatus of claim 4 wherein said means for preventing the integration of the head position error signal when the head speed is beyond a predetermined range includes a switching means for diverting the integration of the head position error signal.

6. The storage apparatus of claim 4 wherein the means for detecting movement determines speed in terms of widths of said target track crossed per sector.

7. The storage apparatus of claim 6 wherein the predetermined range of speed for the means for detecting movement of the head is less than one track width per sector.

8. The storage apparatus of claim 6 wherein the predetermined range of speed for the means for detecting movement of the head is less than one half track width per sector.

9. An apparatus for correcting the position of the head as it follows a target track on a disk in a disk drive, said apparatus comprising:
   means for generating a position error signal, said position error signal being generated by position error detecting means, and representing the positional difference of said head from said target track that is to be followed by said head;
   means for integrating the output of the means for generating the position error signal into a position control signal, said position control signal being used by position control means to control the position of said head;
   means for detecting cross track speed of the head, said means for detecting cross track speed having an output; and
   switching means for controlling the means for integrating the output of the means for generating the position error signal in response to the output of the means for detecting the cross track speed of the head.

10. A method for controlling the position of a head in a rotating memory device which has a disk which includes a plurality of tracks, each of said plurality of tracks including a number of sectors positioned around said tracks wherein representations of data are written to or read from the said tracks with the head of the rotating memory device, said head being made to follow a target track said method for providing target track following comprising the steps:
   producing a head position error signal indicating any positional difference of the head from said target track that is to be followed by the head;

integrating the position error signal to control the position of the head;

permitting the head position error signal to be integrated when the speed of said head does not exceed a predetermined value, said speed of said head being determined by speed detection means connected to head position detection means and prohibiting the head position error signal from being integrated when the speed of said head is not within the predetermined range.

11. The method for controlling a position of a head as claimed in claim 10 wherein said predetermined range is from a negative predetermined speed to a positive predetermined speed.

12. The method for controlling a position of a head as claimed in claim 11 wherein said predetermined range is from $+\frac{1}{4}$ track width/sector time to $-\frac{1}{4}$ track width/sector time.

13. The method for controlling a position of a head as claimed in claim 10 wherein the step of integrating the position error signal produces an output having a component which is constant for cancelling a constant error in said rotating memory device.

14. The method for controlling a position of a head as claimed in claim 10 wherein the step of integrating the position error signal further includes the step of adding said head position error signal generated for each sampling time to said head position error signal for the previous sampling time.

15. The method for controlling a position of a head as claimed in claim 14 wherein the step of producing a head position error signal is performed for each of said sectors positioned around said target track.

16. A method for correcting the position of a head in a disk drive as said head follows a target track, said method comprising the steps of:

generating a position error signal, said position error signal being generated by position error detecting means and representing the positional difference of said head from said target track that is to be followed by said head;

integrating the generated position error signal into a position control signal, said position control signal being used by position control means to control the position of said head;

detecting the cross track speed of the head; and permitting the integration of the generated position error signal in response to the detected cross track speed of the head being below a selected level.

* * * * *